United States Patent [19]

Shima et al.

[11] Patent Number: 4,571,169

[45] Date of Patent: Feb. 18, 1986

[54] MOLD CLAMP APPARATUS FOR MOLDING MACHINE

[75] Inventors: Yoshiharu Shima; Masaaki Miyahara, both of Ueda; Nobuyuki Nakamura; Kaoru Yanagisawa, both of Toguramachi, all of Japan

[73] Assignee: Nissei Plastics Industrial Co., Ltd., Japan

[21] Appl. No.: 682,931

[22] Filed: Dec. 18, 1984

[30] Foreign Application Priority Data

Dec. 21, 1983 [JP] Japan .................... 58-241766

[51] Int. Cl.$^4$ .................... B29C 45/67; B29C 45/56
[52] U.S. Cl. .................... 425/451.9; 100/219; 100/269 R; 164/321; 425/589
[58] Field of Search .................... 100/214, 219, 269 R, 100/43; 425/450.1, 451.9, 542, 589, 533

[56] References Cited

U.S. PATENT DOCUMENTS

| | | |
|---|---|---|
| 3,197,994 | 8/1965 | Samuel et al. .................... 100/214 |
| 3,768,951 | 10/1973 | Valyi .................... 425/406 |
| 3,848,525 | 11/1974 | Kent et al. .................... 100/269 R |
| 3,951,579 | 4/1976 | Myers et al. .................... 425/450.1 |
| 4,080,144 | 3/1978 | Hehl .................... 425/589 |
| 4,099,905 | 7/1978 | Nash et al. .................... 425/589 |
| 4,105,385 | 8/1978 | Hehl .................... 425/451.9 |
| 4,106,885 | 8/1978 | Poncet .................... 425/450.1 |
| 4,285,384 | 8/1981 | Wunder .................... 425/589 |
| 4,315,728 | 2/1982 | Hehl .................... 425/589 |
| 4,487,569 | 12/1984 | Hehl .................... 425/589 |

Primary Examiner—Willard E. Hoag
Attorney, Agent, or Firm—Ostrolenk, Faber, Gerb & Soffen

[57] ABSTRACT

The present invention provides a mold clamp apparatus having a novel construction wherein, though the advance of the movable platen is blocked, it is possible to perform a powerful mold clamping operation as in case of a direct compression operation, and it is also possible to make a support of the movable platen accurate by connecting the tie bar to the fixed platen, and further it is also possible to perform a high-speed mold-closing operation and a powerful mold-clamping operation continuously.

5 Claims, 7 Drawing Figures

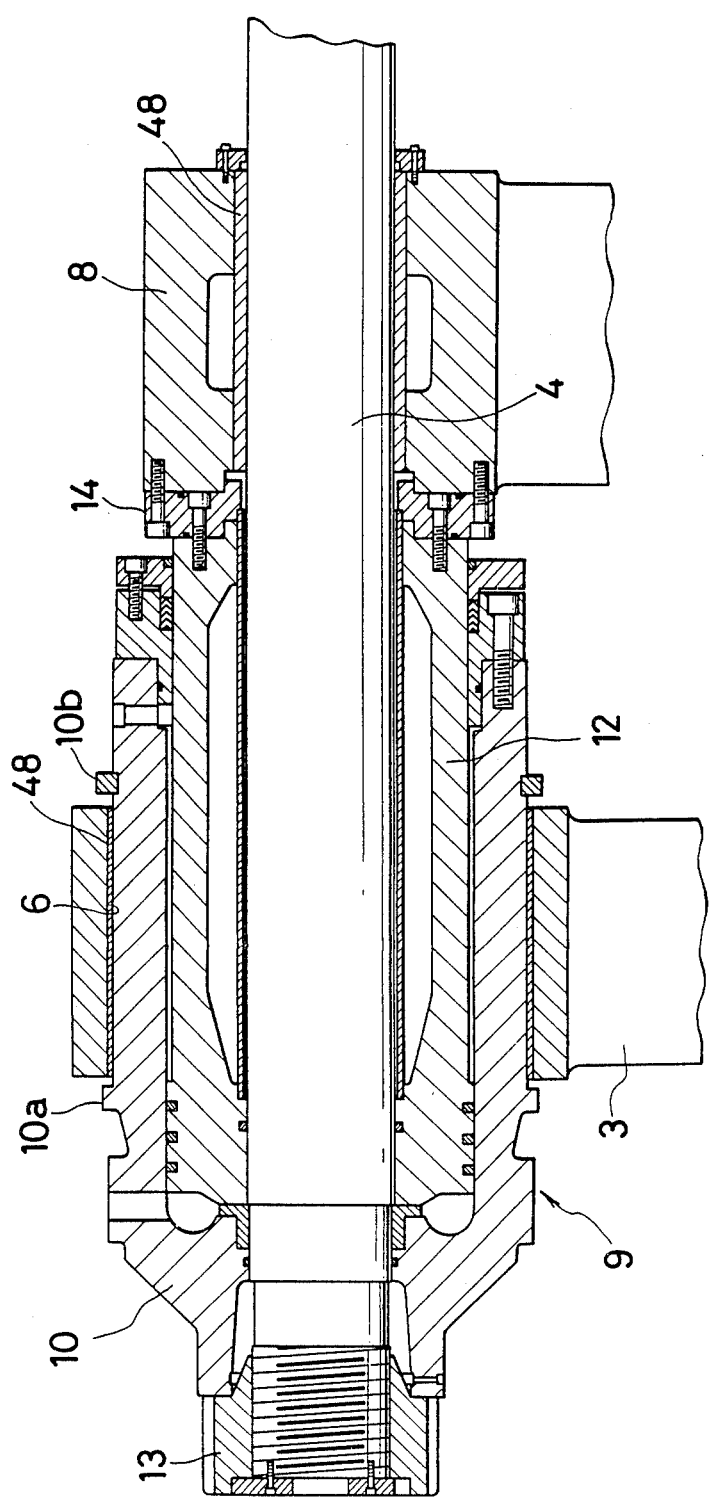

MOLD CLAMP APPARATUS FOR MOLDING MACHINE

BACKGROUND OF THE INVENTION

1. Field of the Invention:

The present invention relates to a mold clamp apparatus for a molding machine for a synthetic resin, performing a powerful mold-clamping operation after it block a movement of a movable platen having made the mold closed.

2. Description of the Prior Art:

A blocking operation of the movement of the movable platen in this type of the mold clamp apparatus is performed with the use of a fixed platen known under the name of an end plate, or the use of a platen connected to tie bars. In a type of an apparatus in which the movable platen is blocked in its movement with the use of the fixed platen, since a mold clamp cylinder is set behind the movable platen, a construction of the movable platen is complicated to increase its weight and energy consumption for opening, closing and moving the movable platen. Further, in case that a high-speed opening/closing operation is required, such construction is disadvantageous. In contrast with this, in a type of the apparatus in which the movable platen is blocked in its movement with the use of the plate of the tie bars, since a rear mechanism for the movable platen is not required, it is possible to simplify the construction of the movable platen to reduce its weight so as to make the movable platen advantageous in case that the high-speed opening/closing operation thereof are performed. However, in this case, there is a defect in that, since the powerful mold clamping operation is conducted by pulling the tie bars with the use of the mold clamp cylinder mounted on the fixed platen, there is no means for fixing the tie bars and this results in a poor support for the movable platen.

Further, in the blocking type of the apparatus, since a pressurized hydraulic oil is fed to the mold clamp cylinder only after the movable platen is blocked in its movement, a dead time of the machine is produced between the high-speed mold closing operation and the powerful mold clamping operation. Although such dead time is a slight time interval to a time when the movable platen is blocked in its movement, it is not preferable for the mold clamp apparatus which should be operated primarily in a continous manner.

SUMMARY OF THE INVENTION

The present invention is made to resolve the defect inherent in the above-mentioned blocking type of the apparatus. An object of the present invention is to provide a mold clamp apparatus having a novel construction in which the movable platen is blocked in its movement, while a powerful mold clamping operation may be conducted as in a direct compression type of a mold clamp apparatus, and further the tie bars are fixed to the fixed platen to make the support for the movable platen stable, and further it is possible to conduct the high-speed mold closing operation and the powerful mold clamping operation in a continuous manner.

According to the above object, the present invention provides a mold clamp apparatus for a molding machine comprising: four parallel tie bars fixed respectively at one-side ends thereof to four corners of a fixed platen provided on a base mount; a movable platen and a bearing platen provided behind the movable platen each of which is penetrated by the four tie bars and guided by the sames in a movement along the tie bars; four mold clamp cylinders having their cylinder members and their mold clamp rams both penetrated by the other side ends of the four tie bars so as to connect the cylinder members to the other-side ends of the tie bars and connect the mold clamp rams to the bearing platen; a powerful mold-opening rod positioned in a central portion of the machine, an end of which rod is fixed to the movable platen and the other end of which rod passes through a lateral bore provided in the bearing platen, and a predetermined number of bearing rods each of which is fixed to the movable platen at its one end and is positioned in a lateral bores provided in the bearing platen at its the other end; a member for engaging the powerful mold-opening rod to the bearing platen; a mold-opening/closing clinder provided between the movable platen and the bearing platen; and a control unit provided with a control plate acting also as a pressure transmitting member, which unit is provided in a side of the bearing platen facing the movable platen, and acts to open and close the lateral bores opposite the bearing rods.

In the mold clamp apparatus having the above-mentioned construction, it is possible to operate the mold clamp cylinder and the mold-opening/closing cylinder according to any timing schedule, respectively, and also possible to move the movable platen without interrupting its movement during rotation of the control plate. These contribute to a very natural mold-opening/closing operation a timing of which may be controlled in any manner as required.

Since the mold clamp cylinders are separately provided on the ends of the four tie bars fixed to the fixed platen while the mold-opening/closing cylinders are provided independently of the mold clamp cylinder, it is possible to reduce both an amount of hydraulic oil necessary for operation and a time necessary for obtaining a sufficient pressure of such hydraulic oil in comparison with a case where a single large-sized clamp cylinder is employed. In addition to this, it is also possible to make a compression operation easy and to increase its accuracy. These are advantageous effects inherent in the present invention.

Further, since the tie bars and the cylinder members are coaxially arranged relative to the clamp cylinders by inserting the ends of the tie bars into the clamp cylinders according to the present invention, a bending load applied to the tie bars is reduced to further increase a durabiity of the subject apparatus. Further, it is possible to conduct a mold thickness adjusting operation in a very easy manner by simply moving the mold clamping rams relative to the cylinder members without any assistance of a separate means. In this case, it is possible to always obtain a maximum value of an opening/closing stroke in the mold thickness adjusting operation.

Further, in comparison with the direct compression type of the apparatus, since the weights of components movable in high-speed mold-opening/closing operation are reduced, it is possible to reduce a energy consumption of the mold-opening/closing cylinder whereby a speed-up of the operation and an energy saving may be expected.

BRIEF DESCRIPTION OF THE DRAWINGS

The drawings show an embodiment of the mold clamp apparatus for the molding machine according to the present invention, wherein:

FIG. 6 is an enlarged longitudinal sectional view of the mold clamp cylinder.

DESCRIPTION OF THE PREFERRED EMBODIMENT

Figure 1:
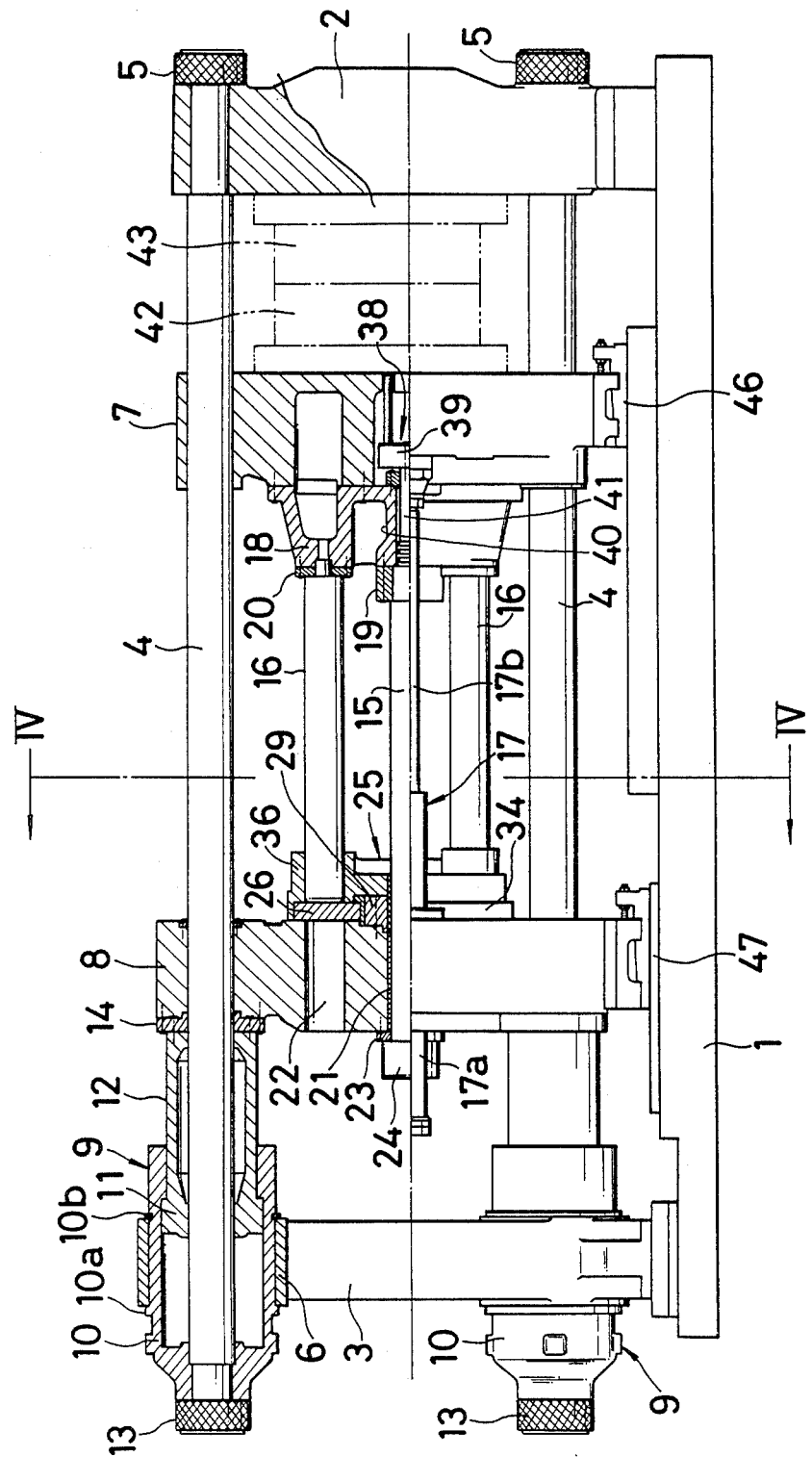
FIG. 1 is a partial cross-sectional side view taken along the line 1—1 of FIG. 5.
Figure 2:
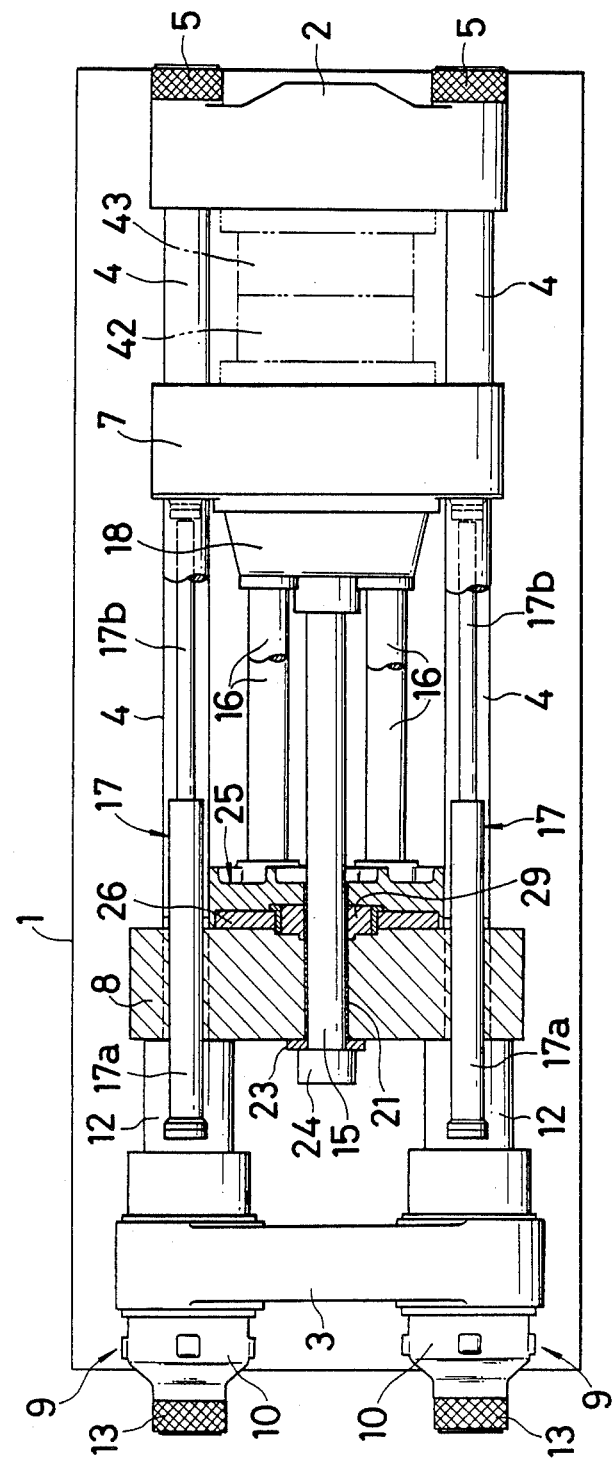
FIG. 2 is a partial cross-sectional plan view of the embodiment.

In the drawings, the reference numeral 1 designates a base mount on an end of which is provided a fixed platen 2 in a standing position and on the other end of which is provided a guide frame 3 opposite the fixed platen 2 in a standing position. The reference numeral 4 designates four tie bars placed above the base mount 1 in parallel thereto, an end of each of which bars 4 is fixed to each of four corners of the fixed platen 2 with the use of a fastening member 5 and the other end of the same 4 extends outward through a large-sized guide hole 6 formed in each of four corners of the guide frame 3.

The tie bar 4 penetrates both a movable platen 7 opposite the fixed platen 2 and a bearing platen 8 behind the movable platen 7 so as to acts as a guide for an axial movements of the movable platen and the bearing platen 8 along the tie bars 4. To a front end of each tie bar 4 is connected a mold clamp cylinder 9 which is operated by a hydraulic oil pressure and is movably mounted in each guide hole 6 of the guide frame 3 in a penetrating manner.

The mold clamp cylinder 9 substantially consists of a cylinder member 10 inserted in the guide hole 6 to be mounted therein and a mold clamping ram 12 formed integrally with a piston 11 received in the cylinder member 10, at a rear end portion of which member 10 and at a center of which ram 12 are formed through-holes each of which has a predetermined diameter. The front portion of each tie bar 4 penetrates the above-mentioned through-holes to protrude forward from the cylinder member 10 and to be fixed to the rear end thereof with the use of a fastening member 13 whereby the tie bar 4 is connected to the mold clamp cylinder 9 as mentioned above.

The mold clamping ram 12 is connected to the bearing platen 8 by a fastening member 14 provided at a front end thereof. The cylinder member 10 is slidably mounted in the guide hole 6 provided in the guide frame 3 so as to be movable in its axial direction. Incidentally, a flange 10a, which is provided on a rear peripheral portion of the cylinder member 10, and a ring member 10 fitted to a front peripheral portion of the same 10 are means for mounting the cylinder member 10 on the guide frame 3, which means are provided in an area where the means do not affect a relative movement of the cylinder member 10 to the guide frame 3.

Between the movable platen 7 and the bearing platen 8 are provided a single powerful mold-opening/closing rod 15 positioned centrally; four bearing rods 16 arranged around the powerful mold-opening/closing rod 15; and two mold-opening/closing cylinders 17 positioned opposite sides of the powerful mold-opening/closing rod 15; all of which are parallel with each other.

An end of each rod mentioned above is integrally fixed, by means of fastening members 19 and 20, to a fixed member 18 having a trapezoidal shape in its side view and fixed to a back surface of the movable platen 7 with the use of suitable means such as bolts. The other end of the above-mentioned each rod is inserted or positioned in lateral bores 21, 22 penetrating the predetermined parts of the bearing platen 8.

Further, to the back surface of the movable platen 7 is connected each piston rod 17 of the mold-opening/closing cylinder 17 the cylinder member 17a of which penetrates the bearing platen 8. By means of the mold-opening/closing cylinder 17 operated by the hydraulic oil pressure, the movable platen 7 is moved between the fixed platen 2 and the bearing platen 8 in a reciprocating manner.

The end portion of the powerful mold-opening/closing rod 15 inserted in the lateral bore 21 of the bearing platen 8 is engaged with the ring member 23 fixed to an opening edge of the lateral bore 21 through nut-like fastening member 24 so as to cooperate with the bearing platen 8 when the bearing platen 8 moves toward the guide frame 3 to pull the movable platen 7 in a direction for opening the mold.

Figure 4:
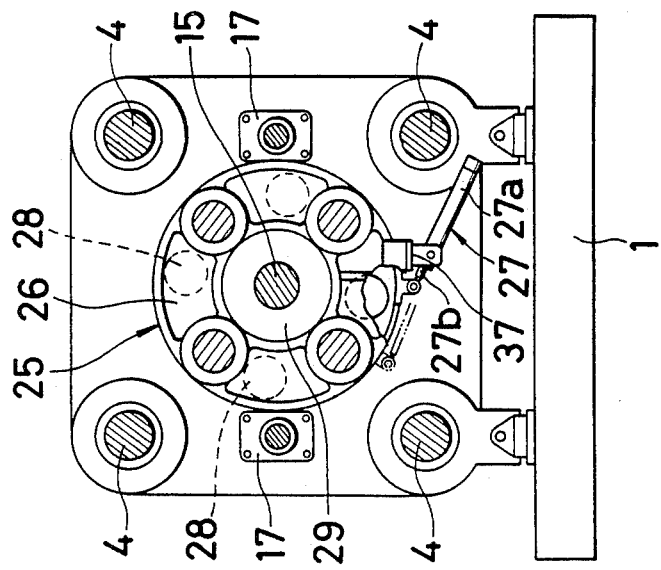
FIG. 4 is a cross-sectional view taken along the line IV—IV.
Figure 7:
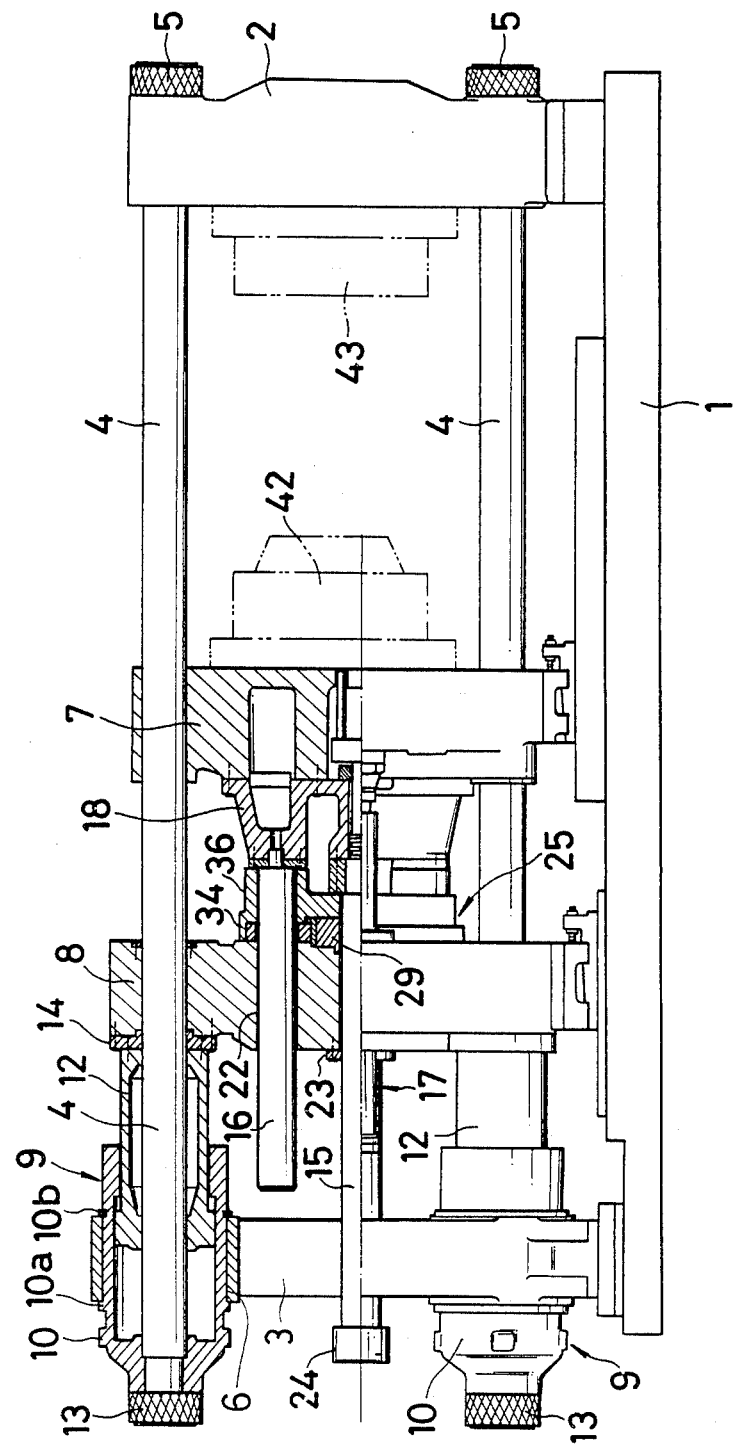
FIG. 7 is a partial sectional plan view of the embodiment when the mold-opening operation is finished.

The reference numeral 25 designates a control unit for blocking the advance of the bearing rod 16, which unit 25 is mounted on a side, opposite the movable platen 7, of the bearing platen 8. The control unit 25 performs an opening/closing operation of the lateral bore 22 at a bore-side opposite the movable platen 7 and closes the lateral bore 22 at a bore-side opposite the same 7 when the movable platen 7 is in a position for closing the mold so as to transmit a mold clamping force applied to the bearing platen 8 to the movable platen 7 through the bearing rods 16. The opening/closing operation of the lateral bore 22 and the transmitting of the mold clamping force is performed by means of a control plate 26 which has a predetermined thickness and is movable along the side surface of the bearing platen 8. The control plate 26 may also be moved by means of a hydraulic cylinder 27 shown in FIG. 4.

The control plate 26 comprises a circular plate provided with a through-hole in its center portion and other four holes 28 in its peripheral portion, which holes 28 are spaced apart from each other with a predetermined interval and have the same diameter as that of the lateral bore 22. The powerful mold-opening rod 15 penetrates the control plate 26 so as to make the control plate 26 rotatable around a hollow core member 29 which is fixed to the central portion of the fixed platen 8.

Figure 3:
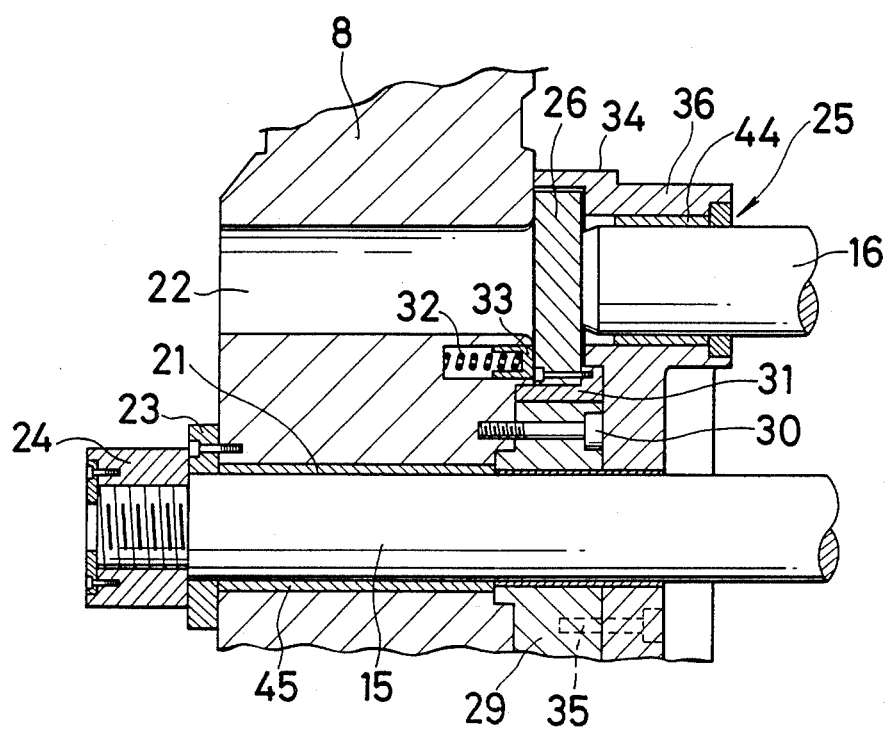
FIG. 3 is a partially enlarged longitudinal sectional view of the bearing platen, showing the details of the control unit.
Figure 5:
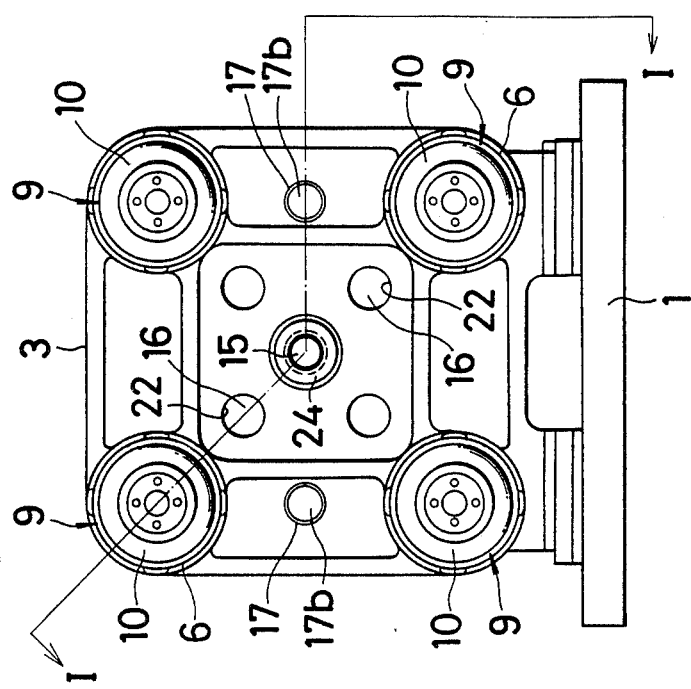
FIG. 5 is an elevational side view of the guide frame.

FIG. 3 shows the details of the control unit 25 wherein the core member 29 is is fixed to the bearing platen 8 by bolts 30. Around the core member 29 is fitted a rotatable ring 31 to which the control plate 26 is fixed. Against an inner surface of the control plate 26 is abutted a resilient pushing member 33 which is provided, together with a spring member 32, in the bearing platen 8 in an embedding manner so as to always press the control plate 26 laterally to prevent the same 26 from vibrating.

The reference numeral 34 designates a cover member of the control unit, a peripheral portion of which cover member 34 is mounted on the bearing platen 8 by bolts and a central portion of which cover member 34 is mounted on the bearing platen 8 by bolts 35 through the core member 29. A guide sleeve 36 for the bearing rod 16 is formed in a portion of the cover member 34 in coincident with the lateral bore 22. The end portion of the bearing rod 16 is guided by the guide sleeve 36 so as to abut on the control plate 26 or enter the lateral bore 22. The hydraulic cylinder 27 is rotatably mounted on the holder member 37 provided in a lower portion of the cover member 34 in protruding manner, with the use of a pin so that a cylinder member 27a is positioned in an inclined position below the cover member 34 and a front end of a piston rod 27b is connected to a lower edge of the control plate 26 by means of a pin to make it possible that the control plate 26 is rotated around the core member 29 as the piston rod 27b is moved in telescopic manner to perform the opening/closing operation of the lateral bore 22.

The reference numeral 38 designates a knockout unit which is substantially consists of a knockout plate 39 with a pin received within a central portion of the movable platen 7; a hydraulic cylinder 40 provided in the central portion of the fixed member 18; and a piston rod 41 at a front end of which the knockout plate 39 is connected.

In the drawings, the reference numerals 42, 43 designate the mold and the reference numeral s 44, 45, 46, 47,48 designate slide metals.

Now, referring to the operation of the apparatus, wherein:

A mold opening step( FIGS. 1 to 7):

First, in a mold clamping position, a pressurized hydraulic oil is fed to each small oil chamber of each mold clamp cylinder 9. The pressurized hydraulic oil exerts a force on the mold clamping ram 12 so as to move the ram 12 leftward while at the same time a reaction to the force is applied to the tie bars 4 connected to the cylinder members 10 and in turn to the fixed platen 2 through the tie bars 4.

Under the influence of the pressurized hydraulic oil, the mold clamping ram 12 moves leftward together with the bearing platen 8 integrally connected thereto along the tie bars 4 acting as a guiding means. In this case, since the end portion of the powerful mold-opening rod 15 is engaged with the central portion of the bearing platen 8, the movable platen 7 is also pulled leftward strongly through the powerful mold-opening rod 15 whereby the mold 42, 43 is gradually opened.

After completion of the mold opening step, a feeding of the pressurized hydraulic oil to each mold clamp cylinder 9 is ended while a feeding of the pressurized hydraulic oil to the hydraulic cylinder 27 is started to extend the piston rod 27b. As a result, the control plate 26 of the control unit 25 is rotated to place the hole 28 on each lateral bore 22 so as to open the bore 22 which has been closed by the control plate 26.

After completion of the rotation of the control plate 26, a feeding of the pressurized hydraulic oil to the mold-opening/closing cylinder 17 is started to feed the pressurized hydraulic oil to the oil chamber within the cylinder member 17 which may move the piston rod 17b leftward whereby the movable platen 7 is pulled leftward at a high-speed together with the piston rod 17b. In this case, since the powerful mold opening rod 15 and each bearing rod 16 pass through the lateral bores 21 and 22 respectively, the bearing platen 8 does not affect the mold opening step even if the bearing platen 8 exists behind the movable platen 7. Further, in the mold opening step, the guide frame 3 does also not affect the high-speed mold opening step even when the above-mentioned each rod comes to a position where the guide frame 3 exists, because these rods may pass through a void of the guide frame 3 outward.

The high-speed mold opening step is ended after a speed slowdown. It is also possible to adjust a mold mounting interval and a mold opening stroke in accordance with various kinds of mold in any suitable manner. In case that it is necessary to increase the mold opening stroke more than that shown in FIG. 7, it is enough to further move the bearing platen 8 toward the guide frame 3. This is easily done by retracting the mold clamping ram 12 into the cylinder member 10 while the remaining components are held as they are.

A mold clamping step( FIGS. 7 to 1):

In a position where the mold opening step is ended, the feeding of the pressurized oil to the mold-opening/closing cylinder 17 is changed over fo feed the pressurized bydraulic oil to the oposite side oil chamber whereby the piston rod 17b is moved rightward at a high speed.

Under the influence of the movement of the piston rod 17b, the powerful mold-opening rod 15 and the bearing rod 16 move reghtward also together with the movable platen 7 to complete a high-speed mold closing step immediately after the speed slowdown.

Then, the pressurized hydraulic oil is fed to the hydraulic oil cylinder 27 to retract the piston rod 27b whereby the control plate 26 is rotated counterclockwise to be out of alignment with each hole 28 so as to close each lateral bore 22. After that, the pressurized hydraulic oil is fed to a left-side oil chamber of the cylinder member 10 of each mold clampcylinder 9 to push the mold clamping ram 12.

The thus obtained mold clamping force is transmitted to the movable platen 7 from the bearing platen 8 through the control plate 26 and the bearing rod 16 so as to clamp the mold 42, 43 having been closed. On the other hand, a reaction to the mold clamping force is transmitted to the fixed platen 2 through the tie bars 4 connected to the cylinder member 10, In such a condition, a molten material is pushed into the mold cavity from the fixed platen side 2. The material pushing force acts on the mold halves 42, 43 to separate them. However, since such a material pushing force is overcome by the mole clamping force, there is no fear that the mold halves 42, 43 are separated.

Incidentally, in the above embodiment, though the movement of the control plate 26 is performed by the hydraulic cylinder 27, it is also possible to replace the hydraulic cylinder 27 with another means, for example such as a pinion-and-rack gearing or a motor, and, if necessary, it is also possible to define the movement of the control plate 26 as a sliding one not the rotational movement.

Although, in the description of the operation of the above embodiment, a case where the mold-opening/closing cylinder 17, the hydraulic cylinder 27 and the mold clamp cylinder 9 are sequentially operated to per form the blocking step of the advence of the bearing rod 16 by means of the rotatable high-speed type of the mold-closing control plate 26 and the powerful mold clamping step in sequential manner is presented, it is also possible to operate the mold clamp cylinder 9 and the mold-opening/closing cylinder 17 according to any individual timing schedules, respectively.

For example, in case that a distance necessary for opening the mold is long, i.e., a large amount of movement of the mold clamping ram 12 is required, it ia also possible to advance a part of a stroke of the mold clamping ram 12 before the piston rod 17b of the mold-opening/closing cylinder 17 is extended in the mold-closing stroke.

Further, it is also possible to perform the powerful mold-clamping operation after completion of the mold colsing operation which is conducted after completion of the rotation of the control plate 26 by means of the hydraulic cylinder 27 during which rotation the movable platen continues its advance while the extending movement of the piston rod 17b by means of the mold-opening/closing cylinder 17 has been completed during which extending movement the advance of the mold clamping ram 12 is started by means of the mold clamp cylinder 9 when the mold is closed. It is also possible to perform the mold opening operation in a continuous manner without any interruption of movement of the movable platen 7 when the powerful mold-opening operation changes into the high-speed mold-opening operation in the mold-opening stroke.

What is claimed is:

1. A mold clamp apparatus for a molding machine comprising: a fixed platen provided on a base mount; four parallel tie bars an end of each of which is fixed to each of four corners of said fixed platen; a movable platen penetrated by said each tie bar and opposite said fixed platen; and a hydraulic unit provided behind said movable platen for moving said movable platen relative to said fixed platen and for performing a mold-opening/closing operation of mold halves mounted on said fixed platen and said movable platen respectively and a powerful mold-clamping operation of said mold halves, characterized by further comprising:

a bearing platen penetrated by an end of said each tie bars and provided movably behind said movable platen;

four mold clamp cylinders each of which is provided with a cylinder member and a mold-clamping ram both of which are penetrated by the outher end of said each tie bar, said cylinder member being connected to the other end of said each tie bar, and said mold-clamping ram being connected to said bearing platen;

a central powerful mold-opening rod and a predetermined number of bearing rods provided around said powerful-mold-opening rod, an end of each of both kinds of said rods being fixed to said movable platen, and the other ends of both kinds of said rods being inserted into and being adjacent to a plurality of lateral bores respectively, said lateral bores being provided in a central portion and a peripheral portion of said bearing platen;

a fastening member for engaging a front end of said powerful mold-opening rod having been inserted into said lateral bore;

a mold-opening/closing cylinder provided between said movable platen and said bearing platen; and a control unit provided with a control plate acting also as a pressure transmitting member, said control unit provided in said bearing platen and opposite said movable platen and performing an opening/closing operation of said lateral bores opposite said bearing rod.

2. The mold clamp apparatus for a molding machine as set forth in claim 1 wherein:

said control unit comprises: a control plate provided in said bearing platen and opposite said movable platen; and a hydraulic cylinder for operating said control plate, provided between said control plate and said bearing plate, said control plate being formed from a circular plate provided with a plurality of holes which have the same diameter as those of said lateral bores of said bearing platen and correspond to said lateral bores in position; and a hollow core member fixed to a central portion of said bearing platen is rotatably inserted into said control plate.

3. The mold clamp apparatus for a molding machine as set forth in claim 1 wherein:

said control plate is fixed to a rotatable ring in which said hollow core member fixed to said bearing platen is inserted, and is always laterally urged by abutting on a resilient member embedded insaid bearing platen together with a spring member.

4. The mold clamp apparatus for a molding machine as set forth in claim 1 wherein:

said hydraulic cylinder comprises: a cylinder member movably connected to a holder member protruded from and provided on a lower portion of a cover member covering said control plate in inclined manner; and a piston rod connected to an edge of said control plate at its front end.

5. The mold clamp apparatus for a molding machine as set forth in claim 1 wherein:

said mold clamp cylinder is connected to said tie bar by inserting said cylinder member thereof into a guide hole of a guide frame provided on said base mount in a standing position, said cylinder member being integrally connected to said tie bar through a fastening member screwed on an end of said tie bar.

* * * * *